United States Patent
Rasmussen (10) Patent No.: US 8,309,206 B2
(45) Date of Patent: Nov. 13, 2012

(54) METHOD AND APPARATUS FOR MANUFACTURING A TRANSVERSELY ORIENTED FILM OF THERMOPLASTIC POLYMER MATERIAL AND PRODUCTS OBTAINABLE BY THE SAME METHOD

(76) Inventor: Ole-Bendt Rasmussen, Walchwil (CH)

( * ) Notice: Subject to any disclaimer, the term of this patent is extended or adjusted under 35 U.S.C. 154(b) by 512 days.

(21) Appl. No.: 12/309,164

(22) PCT Filed: Jul. 11, 2007

(86) PCT No.: PCT/EP2007/057119
§ 371 (c)(1),
(2), (4) Date: Mar. 16, 2010

(87) PCT Pub. No.: WO2008/006858
PCT Pub. Date: Jan. 17, 2008

(65) Prior Publication Data
US 2010/0297401 A1    Nov. 25, 2010

(30) Foreign Application Priority Data
Jul. 13, 2006 (GB) .................................... 0613969.5

(51) Int. Cl.
| | |
|---|---|
| *B32B 3/30* | (2006.01) |
| *B32B 37/28* | (2006.01) |
| *B32B 38/04* | (2006.01) |
| *B28B 3/20* | (2006.01) |
| *B29C 47/00* | (2006.01) |

(52) U.S. Cl. ........ 428/156; 428/167; 428/172; 428/910; 425/113; 425/296; 264/176.1; 264/209.5; 264/210.1; 264/211.12; 156/229; 156/250; 156/244.15; 156/244.18; 156/244.25

(58) Field of Classification Search .................. 428/156, 428/167, 172, 910; 425/113, 296, 392; 264/176.1, 264/177.14, 209.5, 210.1, 211.2; 156/229, 156/250, 244.15, 244.18, 244.25
See application file for complete search history.

(56) References Cited

U.S. PATENT DOCUMENTS
5,626,944 A * 5/1997 Rasmussen .................... 428/172
7,132,151 B2 * 11/2006 Rasmussen .................... 428/182
* cited by examiner

*Primary Examiner* — Donald J Loney
(74) *Attorney, Agent, or Firm* — Robert W Strozier (57) ABSTRACT

A method of manufacturing an oriented film of thermoplastic polymer material comprises extrusion of a film in tubular form from an extrusion die, orienting the film in a main direction of orientation during the haul-off from the die while in molten or semi-molten state, the direction being at an angle between 0 and 45-to the axis of the tube, followed by cutting of the tube at an angle to its main degree of orientation to form a web having an orientation of no less than 20 to its longitudinal direction, which method involves segmental stretching of the film to form an array of linear bosses (1), being of thicker material, integrally connected by thinner webs (2), said bosses and webs extending in a direction which is generally parallel with the direction of orientation, forming an acute angle to the longitudinal direction of the web, the method involving, after segmental stretching and cutting, shearing of the bosses along one another under re-orientation in the connecting webs, to increase the angle at which the bosses and webs extend relative to the direction of orientation. The bosses are separated from one another by no more than 3 mm. The shearing operation may be carried out by segmental rollers (5).

62 Claims, 8 Drawing Sheets

METHOD AND APPARATUS FOR MANUFACTURING A TRANSVERSELY ORIENTED FILM OF THERMOPLASTIC POLYMER MATERIAL AND PRODUCTS OBTAINABLE BY THE SAME METHOD

RELATED APPLICATIONS

The present application is a nationalization of PCT/EP2007/057119 filed Jul. 11, 2007 published as WO 2008/006858 on Jan. 17, 2008, which claims priority to GB 0613969.5 filed Jul. 13, 2006.

BACKGROUND OF THE INVENTION

1. Field of the Invention

The base objective of the invention appears from the title. The term transversely oriented is here meant to include any orientation forming a significantly large angle with the longitudinal direction of the film including but not limited to orientations which are perpendicular or almost perpendicular to the longitudinal direction. The main purpose of making transversely oriented film is as part of the manufacturing process for crosslaminates, i.e., laminates of films of which at least two are uniaxially or unbalanced biaxially oriented, and in which the main direction of orientation in one of these films crosses the main direction in the other one.

2. Description of the Related Art

As background for the understanding of the invention a more detailed view over existing crosslamination technology may here be useful. This mainly concerns the inventor's earlier publications.

The polymer materials for crosslaminates have been mainly and are mainly polyethylene and polypropylene of different types often modified by blending, and the old and present industrialized manufacturing processes comprise the steps of extruding a tube, which, by the draw-down, is oriented mainly in its longitudinal direction, helically cutting this tube to a web with its main direction of orientation on the bias, and continuously laminating two or more such webs with their main directions of orientation criss-crossing. There can also as mentioned be included in the laminate a film which is oriented mainly in its longitudinal direction.

In the first commercialized technology based on these principles, the extruded tubular film, which is melt-oriented mainly in its longitudinal direction, is further cold stretched in this direction prior to the helical cutting. In a later commercialized technology, disclosed, e.g., in U.S. Pat. No. 4,039,364, each tubular film is coextruded, having a layer which contributes mainly to the tensile strength in the laminate and at least one surface layer adapted to help in the bonding of the films, which at least partly takes place by pressure and heat.

Also special layers are coextruded on the films, which become exterior in the laminate. These special layers are adapted to modify the surface properties of the laminate, especially for improved heat-sealing. In this later technology the helical cutting takes place in direct succession to the coextrusion without any cold stretching between, but in a separate production line. Further stretching is carried out when the films have been brought together in a sandwich arrangement, bonded or not yet bonded, to form a laminate. The films are biaxially stretched at a relatively low temperature. The transverse component of this biaxial stretching takes place between grooved rollers. In U.S. Pat. No. 5,028,289 and U.S. Pat. No. 5,626,944 this stretching between grooved rollers has been further developed.

Practical ways of carrying out the helical cutting are disclosed in U.S. Pat. No. 5,248,366. This patent also mentions an alternative cutting technique, namely that the tubular film can be provided with a helically extending melt orientation while it is drawn off from the coextrusion die, established by a relative rotation between the exit of the die and the draw-down means, and subsequently the cutting may be parallel with the axis or may be at an angle to the main direction of orientation. The process may even be adjusted to produce a web in which the main direction of the melt orientation will become perpendicular to the longitudinal direction of the web.

For the sake of completeness it should be mentioned that, in very early patents, there is also disclosed the possibility that longitudinally oriented polymer film material can be discontinuously crosslaminated and bonded in a press.

In a process which is entirely different from that described above, crosslaminates of a very stiff character are made for use in special advanced products. They consist of polymers which in molten or part-molten state are liquid crystals, and which become oriented and crosslaminated already within the extrusion die by means of counter-rotating die-parts. However, this type of process and product is not a subject of the present invention.

Reverting to the other types of crosslaminates, which more are commodities or technical products, the heat-seal strength in a shear-type seal is adequate when a suitable lower melting polymer has been chosen for the surface layers of the laminate, while very special precautions must be taken if good shock-heat-seal strength is requested in peel-type heat-seals, as usually needed for industrial bags supplied with such heat-seals. These precautions are disclosed in U.S. Pat. No. 5,205,650 and WO-A-98/23434.

Recent inventions concerning crosslaminates comprise the inventor's five publications WO02/102592, WO04/54793, WO03/033241, WO04/094129 and WO05/102669. The first two supply one or both plies in a 2-ply crosslaminate with a waved structure like the waving in corrugated paper board, but generally with a wavelength which is shorter than normal for the paper board, generally with the waves extending in the direction of molecular orientation of the respective ply. It is noted that the present invention is useful to manufacture of a transversely oriented film for these crosslaminates.

Both of these publications disclose and claim the formation of a pattern of thinner, biaxial webs. In WO02/102592 it concerns only one of the plies and is described throughout the specification from page 8 onwards and in the claims, and in WO04/054793 it concerns one or both plies and is described throughout the specification from page 12 line 19 and in the claims. In both cases it concerns one set of thin linear biaxially oriented webs, which essentially form bonded base of each flute, and further one set of narrower, thin linear biaxially oriented webs, each forming the crest of a flute.

WO03/033241 and WO04/094129 which have been mentioned above, concern in particular special attenuation and orientation processes in connection with the extrusion, by which the strength at elevated temperature, heat-seal properties, yield tension and/or barrier properties can be improved.

SUMMARY OF THE INVENTION

The basic idea of the present invention is that, after helical cutting, very narrow segments of the film, extending along the direction of the uniaxial orientation, are sheared along each other to increase their angle to the longitudinal direction of the film. These segments have the form of bosses, produced by segmental stretching, and the shearing of the bosses along each other are made possible by thinner webs between the bosses, produced by the segmental stretching. The shearing produces a reorientation in these webs, but the essential part of the film orientation will be the orientation of the bosses, which—at least essentially—still will be the orientation formed by the pull-off from the extrusion die, possibly supplemented by a stretching in the same direction at a selected, lower temperature, before the helical cutting.

A key feature of the present invention is that the film is supplied with a pattern of closely spaced "lines" of biaxially oriented, thinner material, under conditions which are specified as a method of manufacturing an oriented film (A) of thermoplastic polymer material, in which thermoplastic polymer material is extruded in tubular form from an extrusion die and is given a main direction of orientation during the haul-off from the die while in molten or semi-molten state, this main direction being at an angle between 0° and 45° to the axis of the tube, and in which subsequently the tube is cut under an angle to its main direction of orientation to form a web with a longitudinal direction having an orientation of no less than 20° to said longitudinal direction, characterised in that, at any stage after the haul off from the die, but at 10 the latest in direct succession to said cutting, the film is segmentally stretched to form an array of linear bosses distributed over the film surface with a division no larger than 3 mm, integrally connected by thinner webs, said bosses and webs extending in a direction which is parallel with the direction of orientation and which forms an acute angle v to the longitudinal direction of the web, and the method is further characterised in that after the said segmental stretching and the said cutting the bosses are sheared along one another under reorientation in the connecting webs to increase the angle v. These "lines" are as already mentioned referred to as the "thinner webs" and the remaining parts of the film are referred to as the "bosses". The pattern of bosses with intervening thinner webs is produced by segmental stretching in a direction which is transverse to the main orientation of the film, preferably a stretching between grooved rollers, as specified in the claims. The embossed pattern is preferably made as fine as practically possible, and for that purpose an improved method and improved apparatus for grooved roller stretching has been invented. It is not new to provide one or both plies in a crosslaminate with a pattern of thinner webs, but it has been done under different conditions, namely in the manufacture of fluted (corrugated) crosslaminates, disclosed in WO02/102592 and WO04/054793, which shall be discussed later.

BRIEF DESCRIPTION OF THE DRAWINGS

Throughout the specification, downstream does not necessarily refer to an in line apparatus, but can also refer to a series of pieces of apparatus. The invention shall now be described in further detail with reference to the drawings, of which:

FIG. 4A, B and C are sketches of a bulky film (C) supplied with a fine pattern of "bosses" separated by linear thinner webs, the bulk obtained by a pleating transverse of the direction of the bosses within distinct areas and essentially no pleating outside these areas. In FIG. 4A the bosses and the pleated areas extend mainly perpendicularly to the machine direction (MD), in FIG. 4B they extend mainly parallel with the machine direction, and in FIG. 4C they extend mainly under an angle of about 45° to the machine direction.

DETAILED DESCRIPTION OF THE INVENTION

Crosslaminates of oriented films from synthetic polymer materials have been commercially produced since 1966, then mainly as described in GB-A-0792976 (Rasmussen) of May 23, 1955. To the inventor's knowledge the total annual worldwide production today amounts to about 30,000 tons. The crosslaminate is used in particular as industrial bags, coversheet, tarpaulins, pond-liners and similar products, but one of the specific objectives of the present invention is to widen the range of uses by achieving with cost advantage higher yield tensions and/or lower gauges.

Compared to generally unoriented films, crosslaminates exhibit very improved strength properties, seen in relation to the square metre weight, and since the raw material price is the most important part of the cost price, the crosslamination technology can serve to reduce the cost by reduction of weight. Compared to biaxially oriented film crosslaminates made (under adequate conditions) from similar polymers, exhibit dramatically improved tear propagation resistance.

As it shall be further explained below with reference to the relevant patents, the existing technology for manufacture of crosslaminates is based on helical cutting of longitudinally oriented tubular film, to produce a web which is oriented on bias. Two or more such webs are then continuously crosslaminated. There may also be a longitudinally oriented web included in the lamination, and further plies, not necessarily oriented. The orientation in the tubular film may be limited to the type which is achieved by deep and mainly uniaxial stretching in molten or semi-molten state, or such orientation may be supplemented before the helical cutting, by a strong stretching essentially below the melting range of the film, in case of HDPE or isotactic or syndiotactic PP preferably between about 20-50° C. Alternatively, the helical cutting may be carried out without first supplementing the orientation, in which case biaxial stretching is carried out during or subsequent to the lamination at a relative low temperature (see below).

Both alternatives suffer from limitations in the practically achievable stretching ratios. In case the lay-flat tubular film is longitudinally stretched in solid state before the spiral cutting, the stretching ratio must, very generally speaking, be limited to a maximum of about 4:1, since at higher stretching ratios the tendency to splitting becomes too high for a safe industrial performance of the spiral cutting process. In case the spiral cutting is carried out without first subjecting the lay-flat tubular film to such stretching, the ratios of biaxial stretching must, still very generally speaking, in both directions be limited to at the highest about 1.6:1, since the tear propagation resistance essentially goes down at higher ratios.

It would be natural to believe that the best way of manufacturing a crosslaminate would be to produce a transversely oriented ply by means of a tenter-frame, and laminate this with a longitudinally oriented ply, however the function of existing tenter-frames is limited to stretching at very elevated temperatures, e.g., 80° C. or higher, which at least in case of HOPE or PP do not provide the ply with the properties which are adequate for cross-laminates. This is explained in detail in WO05/102669, which claims a modified type of tenter-frame suitable for stretching at much lower temperatures. However, all types of tenter-frames are very expensive, especially if they must be constructed to operate on heavy films. Furthermore a cold-stretching which takes place perpendicular to the direction of extrusion, is found to give strength properties which are inferior—in some but not all respects—to a cold-stretching which takes place generally in the direction of the extrusion, when the latter has been adapted to produce a significant, mainly uniaxial orientation in molten or particularly in semi-molten state. In this connection, several laboratories, e.g., the laboratory of the inventor, have during recent years essentially improved the size and character of the uniaxial orientation achieved in semi-molten state, see e.g., WO03/033241 and WO04/094129, which are applicable with advantage in connection with the present invention.

In the method according to the present invention thermoplastic polymer material is extruded in tubular form from an extrusion die and is given a main direction of orientation during the haul-off from the die while in molten or semi-molten state, this main direction being at an angle between 0°-45° to the axis of the tube, and subsequently the tube is cut under an angle to its main direction of orientation to form a web having an orientation of no less than 20° to its longitudinal direction and the method is characterized in that, at any stage after the haul off from the die, but at the latest in direct succession to said cutting, the film is segmentally stretched to form an array of linear bosses distributed over the film surface with a division no larger than about 3 mm, (preferably no more than 2 mm) integrally connected by thinner webs, said bosses and webs extending in a direction which is generally parallel with the direction of orientation (derivations up to about 15 to 20° will normally be acceptable) and which forms an acute angle v to the longitudinal direction of the web, and the method is further characterized in that after the said segmental stretching and the said cutting the bosses are sheared along one another under reorientation in the connecting webs to increase the angle v.

There is also provided in the invention a new film A consisting of thermoplastic polymer material, biaxially oriented with one direction dominating, comprising an array of linear bosses distributed over the film surface with a division no larger than about 3 mm, (preferably no more than about 2 mm) integrally connected by thinner linear webs which each by volume preferably is no less than 20 50% of the average of the two adjacent bosses, the delineation between a boss and an adjacent thin region being understood as the location where the ply thickness is the average between the thickest part of said boss and the thinnest part of said web, and whereby the main cross-sectional portion of each boss is uniaxially oriented sufficiently to achieve the dominating direction of orientation of A, characterized in that the thinner webs exhibit a main direction of orientation forming an angle different from 90° to the direction of the bosses, this angle being such that upon shrinkage at an elevated temperature, the angle v which the bosses form with the longitudinal direction of film A will change to deviate more from 90°.

In this manner the resultant structure will basically be the structure produced by the melt-orientation, possibly modified by stretching in solid state, but in the same direction as the original melt-orientation. It was found that continued stretching according to the original direction tends to produce the best "all round strength properties" in a crosslaminate. "All round strength properties" here refers to a combination of: tensile strength, yield point, tear propagation resistance and puncture resistance. One reason probably is that the chain molecules under these conditions will exhibit a wide spectrum of different degrees of orientation depending on their length.

The angle v is preferably but not necessarily increased to become essentially perpendicular to the longitudinal direction of the film, e.g., to 80° or more. It is noted, however, that an increase from, e.g., 30 to 60° also can have essential advantages, since a 30° cutting angle produces a film which is much wider than the film achieved by 60° cutting, while the strength properties of a crosslaminate made from two 60° films in several cases are superior to the strength properties of a crosslaminate made from two 30° films.

In the introduction to this description the emphasis has been on operating with a tubular film having a high or relatively high longitudinal orientation, and helically cutting this film. This is normally preferable, but in that regard the scope of claim 1 is broader, taking into consideration that there may be produced a helical melt- or semi-melt-orientation, by relative rotation between extrusion die and takeup rollers as described in the above mentioned U.S. Pat. No. 5,245,366 and WO03/033241. In such cases the segmental stretching, which forms the bosses and the thinner webs, must be carried out after the cutting by means of inter-meshing, helically shaped grooved rollers, which are adapted to perform the embossment generally parallel with the direction of orientation.

As it appears from the introduction to this description, a preferred embodiment is characterized in that after the stretching in molten or semi molten state, but prior to the cutting, the tubular film A is further stretched generally in its longitudinal direction at an essentially lower temperature, e.g. between about 20-50° C. In most cases it is furthermore preferably that, following the increase of v, film A is further stretched in its lateral direction. This stretching is generally carried out in one or more steps by means of intermeshing grooved rollers, the grooves of which are circular or helical.

At least a first step of such grooved roller stretching is preferably carried out in line with the shearing which increases the angle v and still more preferably as close as practically possible to the apparatus which performs this shearing. The purpose is to minimize the elastic recovery after the shearing.

As an alternative to the use of grooved rollers, a tenterframe may be used. It was mentioned in the introduction that the use of tenterframes in the manufacture of crosslaminates suffers from several drawbacks, namely
 a) the need to use high stretching temperatures;
 b) the high price of tenterframes; and
 c) generally inferior strength properties when the direction of this stretching is perpendicular to the melt-orientation.

However, when the direction of melt-orientation has been "turned" to become perpendicular or nearly perpendicular to the machine direction, and especially if the tubular film furthermore has received a significant longitudinal orientation after solidification, the drawbacks a) and c) can be eliminated and the use of a tenterframe becomes a practical possibility.

No matter whether grooved rollers or a tenterframe is used for the transverse stretching, further advantages in strength properties can be achieved when the film is allowed contraction in the machine direction while being stretched in the transverse direction. For the understanding of this, reference is made to WO05/102669. This contraction can be achieved by feeding the film into the transverse stretching devices in transversely pleated form. Alternatively use can be made of a tenterframe of the type which, by gradual increase of the distance between neighbor grippers, performs a longitudinal stretching simultaneously with the transverse stretching, but for the present purpose modified such that the distance between neighbor grippers gradually is decreased.

As mentioned in the introduction, the known crosslaminates, using spiral cutting, suffer from different drawbacks or limitations. When the tubular film is longitudinally stretched below the melting point—preferably very much below this temperature—the stretching ratio must in practice be limited to about 4:1, since higher stretching ratios gives the film too high tendency to split during an industrial spiral cutting process.

In this connection the embodiment of the present invention, which applies transverse stretching after the increase of the angle v, presents an important advantage, since by this method it becomes possible to achieve ultimate values of transverse tensile strength. Such transversely oriented film can be laminated to a longitudinal oriented film of similarly high tensile strength, which may be manufactured by conventional means.

In order to facilitate and enhance the low-temperature stretching before the cutting, the tubular film may be prepared for the stretching by pleating it, as described in the inventor's old patent U.S. Pat. No. 3,233,029.

While the bosses are sheared along each other the distance between adjacent bosses may also be increased by the stretching.

The shearing of the bosses along each other should normally be carried out at an elevated temperature, e.g., between about 50-90° C.

The reorientation in the webs connecting the bosses, caused by the shearing of the bosses along each other will often also extend to the boundaries between the bosses and the webs.

Figure 2:
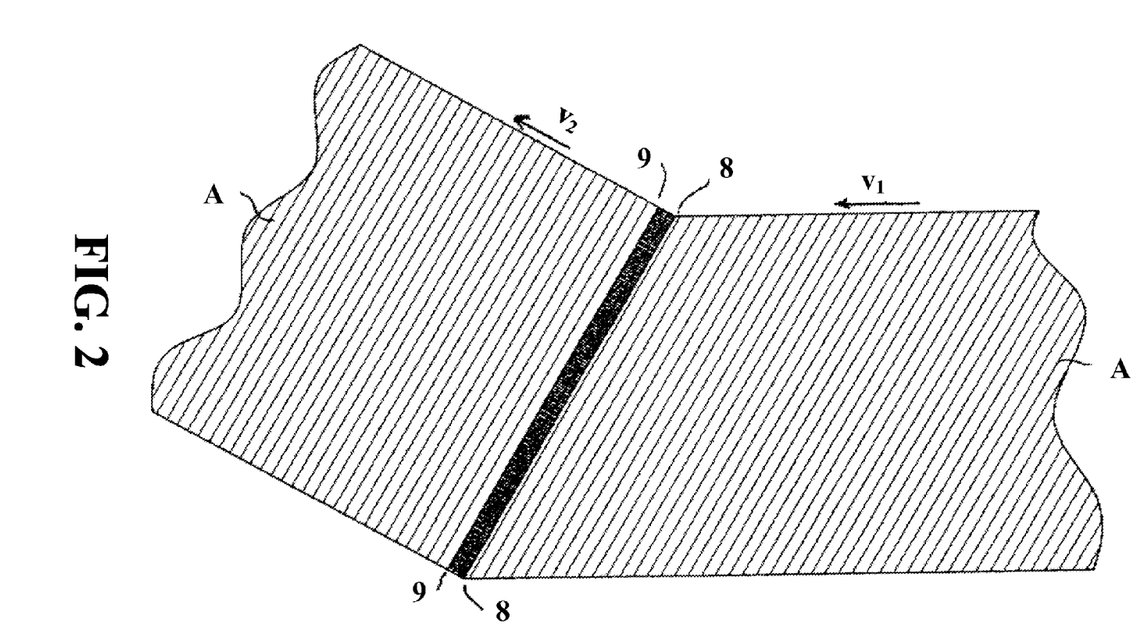
FIG. 2 is a sketch showing in principle how this shearing can conveniently take place by passage through the "Segmental Rollers Apparatus".

A suitable procedure for establishing the shear of the bosses along each other, is characterised in that the shear of the bosses along each other with simultaneous reorientation of the webs is carried out by gripping the film in a linear nip between two supporting and conveying surfaces, which feed and convey the film in a direction which forms an angle u to the perpendicular to the linear nip, the size of u being adapted to the desired change in the direction v, and the film is pulled off from said nip in a direction perpendicular to the extension of the nip by a pulling device which is spaced closely to the nip. In this method it is preferred that this is carried out by means of "segmental rollers", i.e., is characterised in that said nip is formed between a pair of rotating rollers, each with its surface composed of a number higher than 3 of axially movable segments, which are brought to reciprocate along the axial direction in coordination with the rotation of the rollers such that the film constantly is fed to the nip under the same angle u. If the direction of the bosses at the inlet to the nip is nearly parallel to this nip the direction of the bosses becomes perpendicular or nearly perpendicular to the longitudinal direction of the film, as illustrated in FIG. 2 and explained in connection with this sketch.

The procedure described above involving the linear nip and the perpendicular pulling device is a special application of a stretching method conceived for obtaining an orientation under an angle different from 90° to the longitudinal direction of a film, described in the old U.S. Pat. No. 2,505,146. However, the disclosure in this patent operates with film which has an even thickness and even or no orientation all over, and the result is a biased orientation which never can be perpendicular to the machine direction. In connection with the present invention the effect is different, since all orientation or reorientation is limited to the thin webs or the boundaries between the thin webs and the bosses, and hereby the shear between the bosses is established.

The preferred "Segmental Rollers" described above was disclosed in the inventor's old British Patent No. 1,078,732, here in connection with the splitting of strongly oriented film to obtain a fibrous network. The rubber belts used in that fibrillation process are not necessary in connection with the present invention.

Subsequent to the increase of the angle v, i.e. in practice when the film has left the "Segmental Roller" apparatus, the orientation in the webs may be reduced or almost eliminated by selective heating of the webs. This is achieved by contact for a very short time with sufficiently hot air, e.g., at a temperature of about 150° C. or even warmer, and/or by heating for a longer time with hot air while the bosses are kept cooled by contact with a sufficiently cold metal surface, in practice a roller surface.

Suitable selections of the dimensions of the bosses and thinner webs in film A include that the average thickness of each said thinner web is no larger than 80%, and preferably generally between 25-50% of the maximum thickness of the adjacent bosses. The width of the bosses is preferably no more than about 1 mm, preferably no more than generally about 0.5 mm and still more preferably generally in the region 0.05-0.2 mm. It is desirable that the width of each thinner region is at least about 50% of the maximum thickness of the two adjacent bosses, preferably it is no less than 25% of the average width of the two adjacent bosses. The inventor has manufactured this film in gauges down to about 5 $gm^{-2}$, but expect that it also can be manufactured in gauges exceeding 200 $gm^{-2}$. For cost reasons film A may mainly consists of HDPE, isotactic or syndiotactic PP, or blends between these polymers and/or with LLDPE. Although a division for the bosses may be up to about 3 mm, a division of no more than 2 mm is preferred.

With a view to lamination, film A should normally be formed as a multilayered coextruded film, e.g., consisting of a main layer in which the strength mainly resides, and a lower melting surface layer selected to facilitate lamination.

The pattern of embossment by segmental stretching is preferably made as fine as practically and economically possible, and for this purpose new stretching methods by use of grooved rollers have been invented. In a preferred method, the thinner linear webs are produced by means of intermeshing grooved rollers, which perform a generally longitudinal or a generally transverse segmental stretching of the ply, characterised in that each crest on the grooved surfaces of the rollers has two edges, each of which is sufficiently sharp for producing the said thinner linear web in the ply. Preferably, the said two edges are protruding to limit the contact between the ply and the grooved rollers to the edge portions of the crests.

In such a method preferably the grooved rollers are heated, preferably to about 60-80° C., while the web is fed onto the rollers at a lower temperature, e.g., about 20-45° C. to selectively heat the ply on the edge portions of the grooved roller crests.

The intermeshing grooved rollers preferably have pitch of less than 5 mm, preferably between about 0.8-1.2 mm, and the distance from one to the other of said two edges on the crest is preferably between about 0.3-0.5 mm, and the radius of curvature of the sharp edges is preferably less than 50 μm.

In an embodiment, the segmental stretching is a transverse stretching between first circular grooved rollers and this method is characterised in that prior to this segmental stretching, the ply is subjected to a second segmental stretching between second circular grooved rollers, said second segmental stretching between second circular grooved rollers
a) producing only one stretching zone on each crest,
b) having under the operational conditions exactly the same pitch as the first grooved rollers, and
c) being in exact registration with the first grooved rollers such that each stretching zone formed by the second grooved rollers falls between or joins with the two stretching zones formed on the edges of one crest of the first grooved rollers.

As stated in the introduction to this description, film A is normally manufactured to be crosslaminated with at least one further film having a main direction of orientation (film B). While film A normally, in its final form, has its oriented bosses arranged at an angle near 90° to its longitudinal direction, film B can conveniently be oriented mainly in its longitudinal direction.

Film B may also be segmentally stretched to form an array of linear bosses distributed over the film surface with a division no larger than about 3 mm (preferably no more than 2 mm), integrally connected by thinner webs extending in a direction which is generally parallel with the direction of its orientation. In the foregoing description, the function of the thinner webs in film A has been explained as being a condition for change of orientation, normally starting with orientation in the machine direction and after helical cutting and the shearing process ending with orientation generally perpendicular to the machine direction. However, the thinner webs in film A as well as in film B also exert the function to enhance the tear propagation resistance and the puncture resistance.

For further improvement of these properties, the laminate in which both A and B exhibit such thinner webs, is characterised in that, in even distribution over the area of the laminate, at least 50% of the areas of the thinner linear webs in A and in B are unbonded or are weakly bonded such that the bond can be eliminated by repeated flexing and rubbing by hand and the majority of each boss to boss bond, is at least as strong as the strongest one of the immediate adjacent thin web to thin web bonds as determined by peeling at room temperature.

In the introduction, it was mentioned that the present invention can with advantage be used in the manufacture of fluted laminates. Accordingly, an embodiment of the invention is characterised in that at least one of the films A or B is given a fluted configuration.

The laminate or each of its plies may be microperforated or microporous. Microporosity especially in the thinner web may be created by admixture, prior to extrusion, of a powder, which is suitable for creating microvoids during the stretching processes.

The crosslaminate according to the invention can with advantage be used as a cover sheet or a tarpaulin, or for manufacture of bags. In this connection it has been found that a heat-seal joining two crosslaminates according to the invention, exhibits a surprisingly high shock-peel-strength in direction which are perpendicular to one of the main directions, i.e. the machine direction or the direction perpendicular to this, when the laminate consists of one or more films oriented in the machine direction and one or more films oriented generally perpendicular thereto. "Surprising" must here be understood as seen in relation to crosslaminates in which the plies are oriented on bias, e.g. under 45 degrees to the machine direction. This improvement is caused by a higher tendency to shrinkage during the sealing in the direction perpendicular to the seam.

The laminate according to the invention has also been found particularly advantageous for manufacture of pipes or hoses, e.g. for irrigation pipes. The advantages concern the above mentioned heat-seal properties and the possibility to achieve a high tensile strength and correspondingly low elongation at break.

An aspect of the invention concerns a special film product, which at least in low square metre weights exhibits a softness and a bulk, which makes it suitable especially for sanitary uses. A new product consists of thermoplastic polymer material, biaxially oriented with one direction dominating comprising an array of linear bosses distributed over the film surface with a division no larger than about 3 mm (preferably no more than about 2 mm), integrally connected by thinner linear webs, the delineation between a boss and an adjacent thin region being understood as the location where the ply thickness is the average between the thickest part of said boss and the thinnest part of said web and whereby the main cross-sectional portion of each boss is uniaxially oriented sufficiently to achieve the dominating direction of orientation of A, while the thinner webs are biaxially oriented, characterized in that within distinct narrow areas, the film is compressed generally along the direction of the bosses to form a fine pleating, while between the pleated areas the film is in a contracted state with respect to the direction of the bosses, so as to counteract an elimination of the pleating.

Preferably, the average thickness of each said thinner web is no larger than 80%, and preferably generally between 25-50% of the maximum thickness of the adjacent bosses. Preferably, the width of the bosses is generally no more than about 1 mm, preferably no more than generally about 0.5 mm and still more preferably generally in the region about 0.05-0.2 mm. Furthermore, preferably the width of each thinner region is at least about 50% of the maximum thickness of the two adjacent bosses, preferably it is no less than 25% of the average width of the two adjacent bosses. The preferred film has a weight that is at the highest about 50 $gm^{-2}$, preferably no higher than 20 $gm^{-2}$, and more preferably no more than 10 $gm^{-2}$. The division between bosses can be up to 3 mm but is preferably no more than about 2 mm.

In one embodiment of the film, the bosses are generally perpendicular to its longitudinal direction. In another embodiment of the film the bosses are generally parallel with its longitudinal direction. (About 15-20° deviations from these indications are usually also acceptable).

In another embodiment of the film, the direction of the bosses deviates essential from its longitudinal direction and from the direction perpendicular thereto, e.g. it forms an angle of about 30-60° to the longitudinal direction.

The film may be crosslaminated with a film D, which also has a main direction of orientation. Film D may also consist of an array of linear bosses distributed over its film surface with a division no larger than about 2 mm, integrally connected by thinner webs, and the bonding is loose, e.g. established by extrusion lamination using extruded filaments and is further described in connection with the drawings. For many uses, this product should be made microperforated or microporous to allow transmission of water vapor but exerting a suitable resistance to hydrostatic pressure. Suitable polymers for manufacture of the product are HDPE, PP, blends of these polymers with LLDPE, and polyethylene terphphthalate.

The invention also comprises apparatus suitable for carrying out the new method. Apparatus according to the invention for manufacturing an oriented film A of thermoplastic polymer material comprises an extrusion die for extruding thermoplastic polymer material, in tubular form, means for hauling the tubular film, means for providing a main direction of orientation during the haul-off from the die while in molten or semi-molten state, this main direction being at angle of between 0° and 45° to the axis of the tube, and;

helical cutting device for cutting the tube under an angle to its main direction of orientation to form a film web having a main direction of orientation of no less than 20° to its longitudinal direction, characterized by comprising, downstream of the haul-off means and no further downstream than said cutting device, means for segmentally stretching the film to form an array of linear bosses distributed over the film surface with a division no larger than about 2 mm, integrally connected by thinner webs, said bosses and webs extending in a direction which is generally parallel with the direction of orientation and which forms an acute angle v to the longitudinal direction of the web, and downstream of said segmental stretching means and of said cutting device, shearing means for shearing the bosses along one another under reorientation in the connecting webs to increase the angle v. The preferred features for the apparatus for carrying out the invention are defined in the apparatus sub-claims.

Figure 1A:
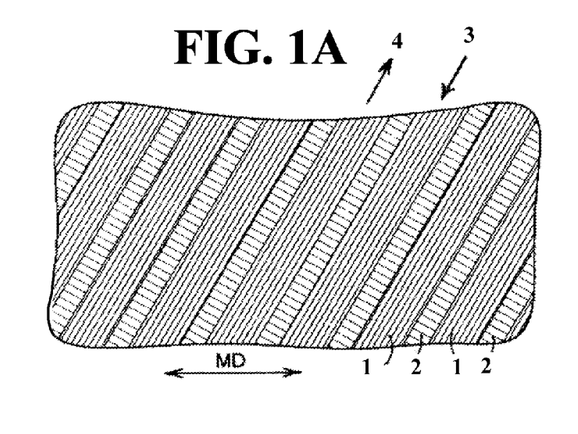
FIGS. 1A and B are sketches to demonstrate the shearing of the bosses in film A along each other to increase the angle between the bosses and the machine direction (MD), FIG. 1A showing film A before and FIG. 1B showing film A after the shearing.

FIG. 1A represents the film A, which has been extruded in tubular form under formation of a strong melt/semi-melt orientation in the direction of extrusion (low blow ratio), optionally has been further longitudinally stretched in its longitudinal direction at a much lower temperature, has been embossed by means of grooved rollers, and finally has been helically cut to make an angle (in the sketch)60° between the arrays of embossment and the new machine direction (MD). The grooved roller's stretching is a segmental stretching, leaving unaffected "bosses" (1) connected by thinner webs (2). The bosses are molecularly oriented in their longitudinal direction as symbolized by the direction of hatching in these regions, while the thinner webs (2) are biaxially oriented, normally (but not always) with a dominating direction perpendicular to the arrays of bosses (1). The hatching in the thinner webs (2) symbolized this dominating direction of orientation.

Figure 1B:
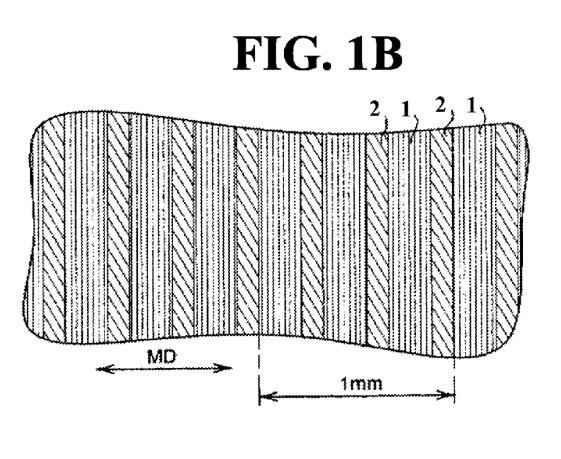
Figure 3:
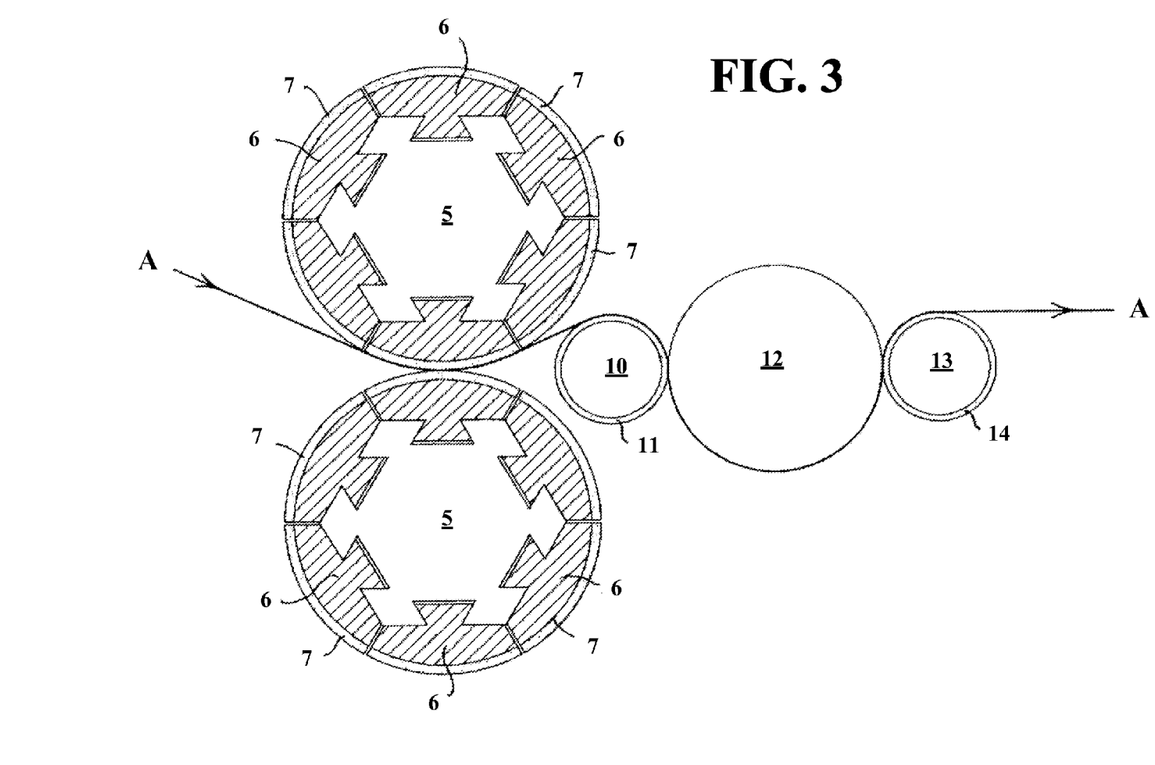
FIG. 3 shows in simplified manner a cross-section through this "Segmental Rollers Apparatus".

The bosses (1) are now sheared along each other as indicated by the arrows (3) and (4), and hereby the structure shown in FIG. 1B is created, the bosses (1) and their direction of molecular orientation now being perpendicular to the machine direction (MD). FIGS. 2 and 3 will show how the shearing of the bosses (1) along each other conveniently can be carried out. As symbolized by the hatching in the thinner webs (2), their dominating direction of molecular orientation has now become biased, corresponding to the shear. The pitch of the stretching should be as fine as practically and economically possible, preferably there should be no less than about 3 bosses per mm as indicated in FIG. 1B.

For the understanding of the preferred carrying out of the shearing process, FIG. 2 should be studied in conjunction with FIG. 3, and preferably also in conjunction with the drawings in GB 1,078,732.

The key apparatus for this shearing processes are the two "Segmental Rollers", each consisting of a core part (5) and segments (6), the latter supplied with a rubber coating (7). The segments (6) are axially moveable on the core (5), running in tracks. These comprise a curved track positioned at least one end of the roller of which that segment is part around that end and with which the segment is rotatably engaged, the curvature of the track being such that the segments are reciprocated longitudinally as they rotate relative to the track. These tracks are here shown in a simplified construction, while in practice they normally should comprise special roller bearings. While the "Segmental Rollers" are rotated, the segments are brought to reciprocate, one time "forward" and one time "backward" during one revolution. This is conveniently arranged by means of cams at one end of each roller, as shown in the drawings in the above mentioned British patent. These cams can be substituted by or supplemented with suitable pneumatic or hydraulic means installed on the rollers, which means are controlled by or which control the rotation of the rollers.

In FIG. 2, the line (8) indicates the nip between the two Segmental Rollers. The direction of the arrays of bosses (1) and thinner webs (2) in film A is symbolized by the direction of the hatching. The reciprocation of the segments is adapted to constantly feed the film A into the nip (8) under an angle essentially corresponding to the pattern of embossment, as shown.

Going back to FIG. 3, the film A, having passed the nip between the rubber coatings (7) on segments (6) of the Segmental Rollers, is gripped by roller (10), which also is supplied with a rubber coating (11), and which is pressed against a steel roller (12). The zone on roller (10) in which film A begins fully to follow the roller, is indicated as line (9) in FIG. 2. Thus the zone in which the shear along the bosses (1) takes place, is the zone between (8) and (9). As the hatching indicates, the bosses (1) now become perpendicular to the new machine direction.

However, zones in A near each of its edges deviate from this (not shown). In order to make these zones as narrow as possible, the width of zone (8) to (9) is reduced to a minimum. This is achieved by giving roller (10) a diameter as small as possible, in practice, e.g. 3-4 cm, and arranging it as close as practical possible to the Segmental Rollers. Roller (12) is driven and drives roller (10) through the nip between the two. It also drives a final nip roller (13) with rubber coating (14).

In order to facilitate the shearing of the bosses (1) along each other, film A is heated, e.g. to 60-90° C., before entering the nip (8), and the rubber coatings on (7) on the Segmental Rollers is heated to a similar temperature, e.g. by infrared irradiation (not shown). Roller (12) is cooled.

If the velocity $V_2$ equals the velocity $V_1$ (see FIG. 2), it can be proven that film A will be stretched in a direction which forms an angle of 45° to the nip, and compressed in a direction perpendicular hereto. This is independent of the angle between $V_1$ and the nip, but the degree of this stretching increases with decreasing angle between $V_1$ and the nip.

Finally it should be noted, that when film A has been relaxed after passage through the Segmental Roller's apparatus, the direction of the bosses (1) will no longer be exactly perpendicular to the machine direction (MD). In order to achieve this, the angle between the bosses (1) and the inlet machine direction (MD) must be a few degrees higher than the angle between the nip (8) and $V_1$.

Figure 4A:
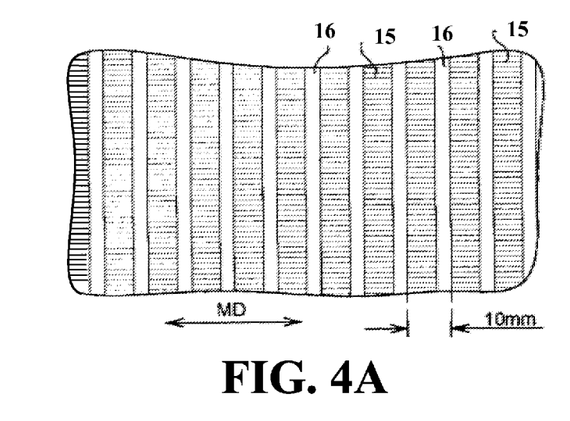
Figure 4B:
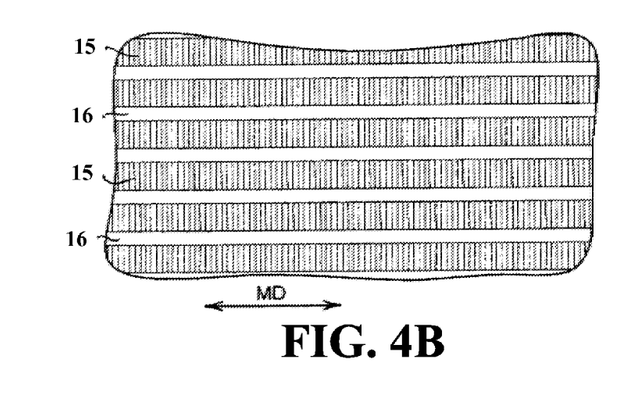
Figure 4C:
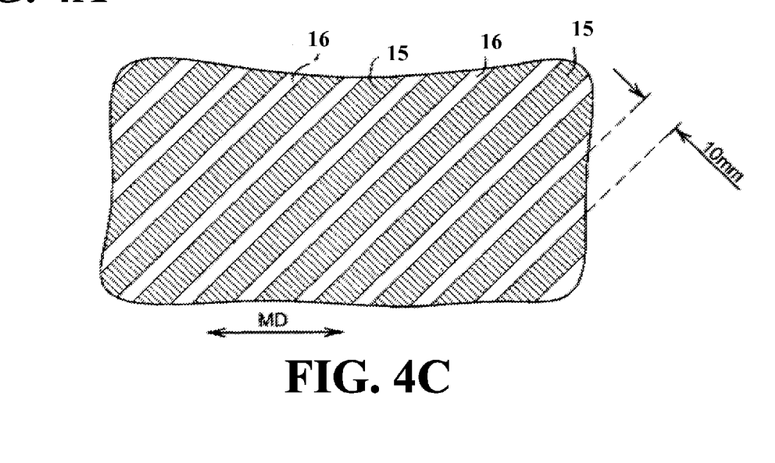

In FIG. 4, each of the linear stripes (15) represents a film segment which consists of several bosses (1) and connecting thinner regions (2), the main extension of the stripes (15) being parallel with the longitudinal direction of the bosses (1) and the webs (2). The individual bosses (1) and webs (2) are not shown in this drawing. All of the segments (15) are in a finely pleated state with the pleats extending in the machine direction, i.e., transverse to the longitudinal direction of the bosses (1) and the webs (2) as symbolized by the hatching of the segments (15). There may be many bosses (1) and thinner webs (2) side-by-side within each of the segments (15), e.g. about 20 bosses and 20 thinner webs.

Between each pair of pleated segments (15), there is a region (16), which is not pleated or is pleated less than the segments (15). These regions (16) will make resistance to a stretching out of the pleats in the segments (15) and thereby will stabilize the bulk of the film. As indicated in the drawing, the pattern of pleated segments (15) and less pleated or unpleated regions (16) may be distributed over the length of the film with a pitch generally around 10 mm, but this pitch may also be larger or smaller, down to less than 1 mm.

The film structure illustrated in FIG. 4A can be obtained by further operations on the film, which is shown in FIG. 1B and made as shown in FIGS. 2 and 3. In this film, the bosses (1) and thinner webs (2) can be supplied with continuous, longitudinally extending pleats by passage between intermeshing grooved rollers with circular or helical grooves, e.g. of a pitch between about 1-2 mm, and immediately following this pleating, the unpleated or less pleated regions (16) can be formed by segmental longitudinal stretching, preferably near room temperature, between intermeshing grooved rollers on which the grooves extend generally along their axial direction. This segmental longitudinal stretching will cause a transverse contraction, which tends to eliminate the pleating in the longitudinally stretched regions, especially eliminating the pleating of the thinner webs (2).

A relatively low degree of pleating may be acceptable, and it may be acceptable that the pleated segments (15) become interrupted to relatively short lengths and become rather unevenly distributed over the film surface. In such cases, the above mentioned two grooved rollers operations may be omitted, and the film may simply be longitudinally stretched in a low stretch ratio at about room temperature, while allowing transverse contraction. It can then spontaneously form the desired structure by "necking down" in zones, which become the regions (16).

FIG. 4B deviates from FIG. 4A in that the pleated segments (15) and the unpleated or less pleated regions (16) extend generally in the machine direction of the film. This can be achieved by the process steps of:
 a) supplying a film with orientation in its machine direction and segmentally stretching it transversely to this direction,
 b) forming transversely extending fine pleats by a stuffing operation, e.g. the stuffing between rubber belts which is disclosed in WO05/102669, FIG. 1b,
 c) segmentally stretching the pleated film between intermeshing grooved rollers, the grooves being circular or helical, to make the pleating disappear, at least in part, by a transverse contraction localized to the regions (16).

Figure 5:
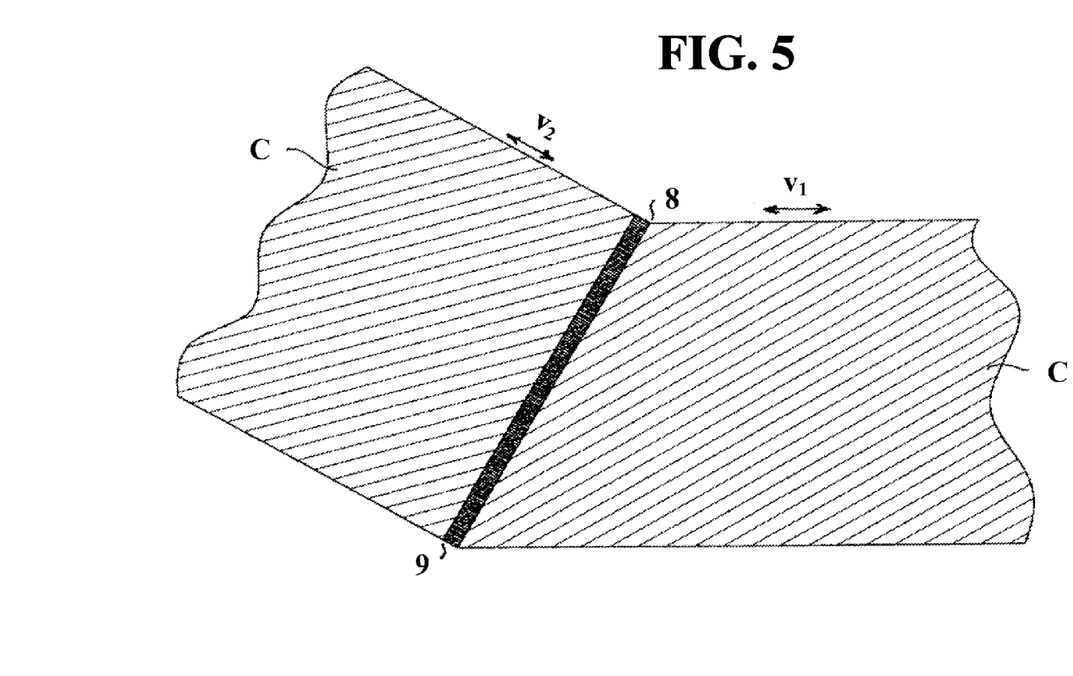
FIG. 5 is a modification of FIG. 2, illustrating a method of manufacturing the structure shown in FIG. 4C.

The structure shown in FIG. 4C is identical with the structures of FIGS. 4A and 4B, except that in FIG. 4C the pleated film segments (15) and the non-pleated or less pleated regions (16) extend mainly under an angle, e.g. of about 45°, to the machine direction, as already mentioned. In the modification of the FIG. 2/FIG. 3 process, which is shown in FIG. 5 and by which the structure can be formed, the film C is fed into the nip (8) between the Segmental Rollers with a pattern of bosses (1) and thinner webs (2) forming an angle with its machine direction which is smaller than the angle between this initial machine direction and the nip (8).

If the inlet velocity $V_1$ and the outlet velocity $V_2$ are equal, the transformation by the change of direction between nip (8) and the roller zones (9) will cause stretching under an angle of 45° to the nip (8) and the zone (9), and compression perpendicularly to this. Preferably the angle between the bosses (1) and the inlet machine direction should be half of the angle between the nip (8) and the inlet machine direction, as symbolised by the hatching in the inlet part of the drawing. It can be geometrically proven, that the film then will be compressed mainly in the direction of the bosses (1) and the thinner webs (2), and stretching will take place perpendicularly to this direction. In the outlet part of the drawing, these directions will form angles of 45° to the outlet machine direction, as also symbolized by hatching. This operation produces the structure shown in FIG. 4C, although not quite as regular as shown here.

Figure 6:
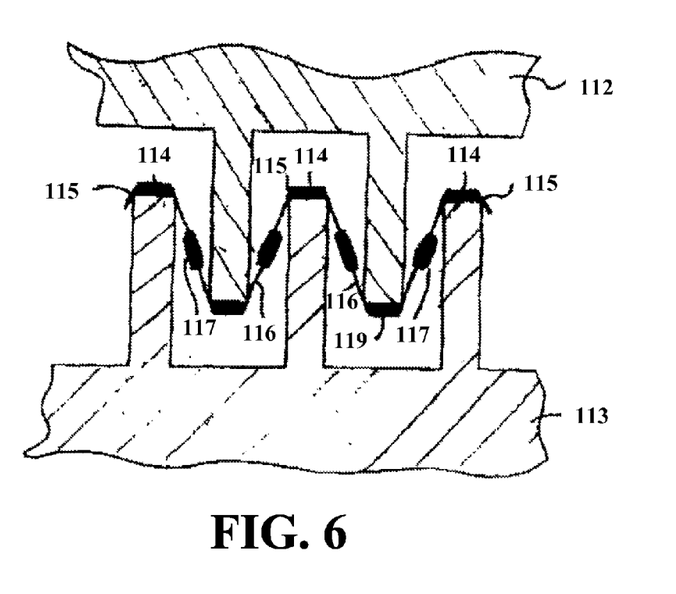
FIGS. 6 and 7 each shows a detail of two intermeshing grooved rollers in the process of segmental stretching of a film material, making two thin webs on each crown of the grooved surfaces. The grooves may be circular or helical but almost circular. The indicated ranges of measures are suitable examples.

With reference to FIG. 6, the mutually intermeshing grooved rollers (112) and (113) which effect the segmental transverse stretching have flat crests (114) on their circular teeth (flat seen in cross-section) with relatively sharp edges (115). The segmental stretching starts on these edges and develops into thin continuous webs (116). The intermeshing is limited such that there are maintained thicker material, bosses, on the flat crests (114) of the circular teeth.

The requirements for precision in the manufacture of the roller surfaces is high, and it is highly advisable to make the outer part of rollers from short segments. The radius of curvature on the "sharp edges" is of importance. It depends on the properties of the coextruded film, but should normally be less than 50 micrometre. A suitable industrial method of making a relatively exact adjustment of this curvature is first to make the edges really sharp, then round them by electrolytic polishing, and finally carry out electrolytic Cr-plating. These electrolytic processes must of course take place under precisely established conditions.

In FIG. 6, the width of the thinner webs (116) is shown to be about equal to the width of the bosses (114). Normally, but not always, it is preferred that the thinner webs (116) in the final product should be narrower than the bosses (114) to give the product good stability. However, FIG. 6 shows the cross-section of the laid-flat tubular film while it is tentered, and the width of the thin regions (116) will be reduced when it leaves the grooved rollers.

Figure 7:
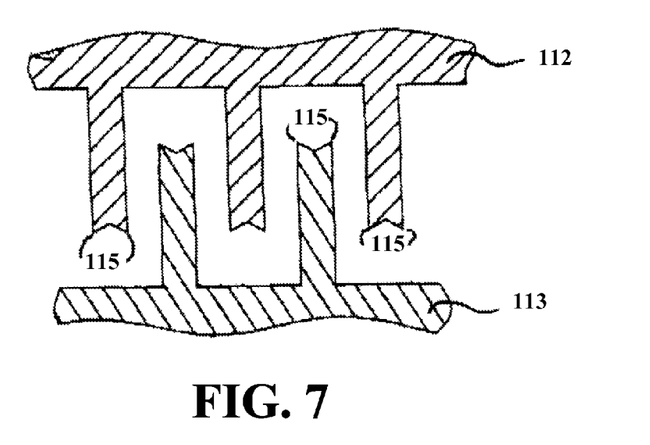

The purpose of making relatively sharp edges on the circular teeth of the grooved rollers is to make the pattern of embossment particularly fine. The precision of this embossment is enhanced by the profile of the teeth which is shown in FIG. 7. Here the crests are not flat, seen in cross-section, but have a concave shape, so that the edges protrude radially beyond the part of the crest between the edges.

Figure 8:
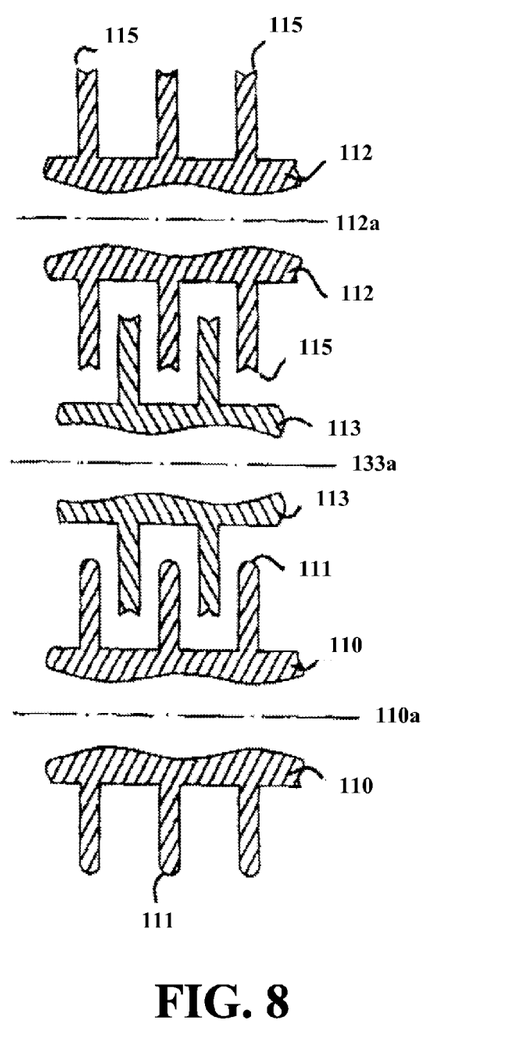
FIG. 8 shows a preferred set-up and operation of the grooved rollers represented by FIG. 6 when the rollers are heated.

In FIG. 8, it should be understood that the two grooved rollers (112) and (113), which are similar to the two rollers in FIG. 7, are heated such that the formation of the thinner webs (116) on the protruding edges (115) is facilitated and their thickness can be better controlled. There is added a third grooved roller (110) with smooth, rounded crests (111). The three grooved rollers are shown in a compact form, that is only two diametrically opposite segments of each roller, and their center lines (112a), (113a) and (110a) are shown.

While rollers (112) and (113) are heated, e.g. to 70-90° C., roller (110) is kept at a much lower temperature, e.g. at around 20° C. Under operational conditions, the three grooved rollers must have exactly the same pitch, i.e. at room temperature rollers (112) and (113) will have a pitch which is smaller than the pitch on roller (110). This roller set-up operates as follows:

The ply follows roller (112) over a distance sufficient to heat the ply-part in contact with the warm protruding edges (115) to the temperature, which has been chosen for the segmental stretching. This takes place when the grooved surface on roller (112) intermeshes with the grooved surface on roller (113). At this point, the ply portions which come in contact with the protruding crown edges on roller (113) will not be stretched since they have not yet been heated, or will be stretched only to a low degree. These ply portions heat up while they follow roller (113), and become stretched when the crests on roller (113) intermesh with the cold, smooth crests on roller (110). The intermeshing between rollers (112) and (113) and between rollers (113) and (110) should be adjusted to make the widths of all webs as equal as possible.

Figure 9:
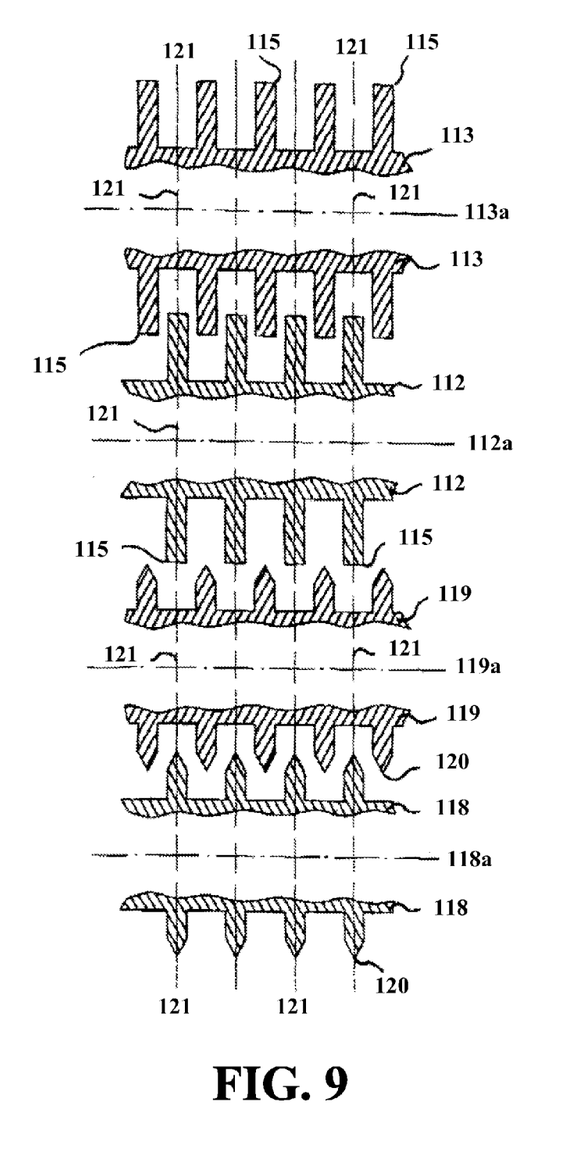
FIG. 9 shows another preferred set-up operation of the grooved rollers represented by FIG. 5 and FIG. 6 namely in "registration" with a set of grooved rollers, which makes one thin web on each crown of the grooved surfaces.

In FIG. 9, the two "registered" sets of grooved rollers are shown in a similar compact drawing as the three rollers in FIG. 8. Rollers (112) and (113) are similar to the two rollers in FIG. 7, while roller (119) has only one relatively sharp edge on a crest of each circular tooth, namely (120) in the middle of the tooth. The teeth on rollers (118) and (119) are mutually intermeshing, each making one stretching zone (thin web) and the two pairs of grooved rollers are in "registration" such that the middle of each tooth on roller (119) almost touches the middle of a tooth on roller (112). In FIG. 9, the registration is indicated by the broken lines (121). Means for securing exact registration between grooved rollers in the manufacture of the latter are known from WO-A-02-102592. As a result of this registered, transverse stretching the film will have formed two bosses (114) and (117) corresponding to each crest of rollers (112) and (113), and thereby a still finer pattern of embossment 5 is achieved.

Rollers (112) and (113) can be installed downstream of rollers (118) and (119), or vice versa, namely that the former are installed upstream of the latter. It depends on the properties of the extruded, meltoriented film which one of the two options is chosen.

EXAMPLE 1

An about 0.1 mm thick 2-layers tubular film is extruded, composed as follows:
Main layer, about 80% of total:
HDPE of m.f.i.=about 0.2 and density=about 0.95 g
Outer surface layer=lamination layer, about 20% of total: an ethylene copolymer which starts melting at about 95° C.
Blow ratio about 1.2:1.

The lay-flat tubular film is longitudinally stretched at about 30° C. in a ratio about 3:1, as measured after relaxation and stabilization by heat. This stretching is carried out in several steps between very closely spaced stretching rollers, as known in the art. After the stretching the gauge of the film is measured to be 0.040 mm.

By the processes described hereinafter, a part of this film (I) is further processed to form a ply with strong orientation in its machine direction, and another (II) is further processed to form a ply with strong orientation perpendicular to its machine direction. Film-part (I) and film-part (II) are finally continuously crosslaminated by spot-bonding under heat and pressure.

In film-part (I) one edge-portion is trimmed off, and the double film is folded out to a single ply. It is further stretched in its longitudinal direction in 4 steps between grooved rollers having axially extending grooves of pitch 5 mm up to a total stretch ratio of 6:1. The film temperature during these 4 stretching steps is 50, 60, 65 and 60° C., respectively. It then is supplied with a fine embossed pattern by means of the apparatus shown in FIG. 6. This embossment takes place with the film and the apparatus heated to 40° C. The pitch on the grooved rollers is 1.2 mm and the width on each flat crown is 0.3 mm. The grooved rollers intermesh in a depth which makes the "thinner webs" about half as wide as the "bosses".

Film-part (II), still in the form of a lay-flat tube, is first embossed exactly as described above, then helically cut under an angle of 70° to its original machine direction and then taken through the process shown in FIGS. 2 and 3. The angle between the inlet machine direction and the nip between the "Segmental Rollers" is 65°. Before meeting this nip the film is heated to 70° C., and the surfaces of the "Segmental Rollers" are kept at the same temperature by controlled infrared heating. Hereby the bosses and the molecular orientation become perpendicular to the new machine direction.

In a direct succession to this operation, the film is further stretched in its transverse direction in 4 steps between grooved rollers having circular grooves of pitch 5 mm up to a total stretch ratio of 6:1. The film temperature during these 4 stretching steps is 50, 60, 65 and 70° C., respectively.

The lamination of film-part (I) with film-pat (II) under use of spot-bonding is carried out at 105° C., using a hot-steel roller with circular grooves and a matching, rubber-coated nip-roller with axial grooves. The area of each bonded spot is 0.25 square mm and the pitch of the bonding pattern is 1.0 mm, both in the machine direction and perpendicular hereto. Most conveniently the strong bond/weak bond lamination method according to WO03/074264 could be used, but there have not yet been practical possibilities to try this.

EXAMPLE 2

This example illustrates the manufacture of a very thin crosslaminate according to the invention.

The extruded tubular film has a thickness of only 0.015 mm.
Composition:
Main layer 60% of total:
HDPE of d=0.95 and m.f.i.=0.2.
Inner surface layer (heat-seal layer) 20% of total: LLDPE of m.f.i.=1.0.
Outer surface layer (lamination layer) 85% LLDPE (m.f.i.=1.0)+15% metalocene LLDPE (m.f.i.=1.0).

This metalocene LLDPE has melting range about 50-60° C. The blow ratio during extrusion was about 2:1 and the drawdown ratio about 40:1. One part of the lay-flat tubular film (film-part I) was cut open at one edge and folded out to single ply form. It then was longitudinally stretched in a line, in which it first was supplied with fine pleats. Such "pleat-stretching" has been mentioned in the general description.

The stretching took place between rubber-coated rollers of diameter only about 30 mm, which were supported by heavier rollers. The stretch ratio was 2.0:1. Following this stretching film-part (I) was embossed exactly as described in Example 1.

Another part of the tube, film-part (II), is similarly embossed while still in lay flat tubular form and before any stretching is carried out (other than the draw-down in molten/semi molten state). It then is helically cut under 70° and subsequently transformed by the FIG. 2/FIG. 3 process, exactly as explained in example 1.

By this transformation, the direction of the bosses with melt-orientation becomes perpendicular to the machine direction. The film then is transversely stretched in 4 steps, exactly as described in example 1.

Finally film-part (I) and film-part (II) are laminated, also as described in example 1, except that the lamination temperature is about 80° C.

I claim:
1. A method of manufacturing an oriented film (A) comprising
extruding a thermoplastic polymer material through an extrusion die to produce a tubular form,
orienting the tubular form, while the material is in a molten or semi-molten state, in a main direction of orientation during the haul-off from the die, where the main direction of orientation is at an angle between 0° and 45° to an axis of the tubular form, cutting the tubular form at an angle to its main direction of orientation to form a web having a longitudinal direction having an orientation at the angle, where the angle is no less than 20° to the longitudinal direction, at any stage after the haul off from the die, but at the latest in direct succession to the cutting, segmentally stretching either the tubular form or the web to form linear bosses distributed over the tubular form or web surface with a division between adjacent bosses of no larger than 3 mm, integrally connected by thinner webs, where the bosses and the webs extending in a direction which is parallel with the orientation, which forms an acute angle v to the longitudinal direction of the resulting web, and after the segmentally stretching and the cutting, shearing the bosses along one another under reorientation in the connecting webs to increase the angle v.

2. The method according to claim 1, wherein the angle v is increased to a value higher than 80°.

3. The method according to claim 1, further comprising:
after the orienting of the tubular form when the material is in the molten or semi-molten state, but prior to the cutting, further stretching the tubular form in its longitudinal direction at a lower temperature between about 20° C. and 50° C.

4. The method according to claim 2, further comprising:
following shearing resulting in the increase of the angle v, further stretching the web in its lateral direction.

5. The method according to claim 4, wherein this stretching is carried out in one or more steps by means of intermeshing grooved rollers, where the grooves are circular or helical.

6. The method according to claim 5, wherein at least the first step of the stretching between grooved rollers is carried out in line with the shearing which increases the angle v.

7. The method according to claim 4, wherein the stretching is carried out by means of a tenter frame.

8. The method according to claim 4, wherein the film is allowed to contract in the machine direction while being stretched in the transverse direction.

9. The method according to claim 3, further comprising:
prior to this further stretching, bringing the tubular form into a pleated state to facilitate and enhance an effect of this stretching.

10. The method according to claim 1, wherein while the bosses are sheared along each other, the distance between adjacent bosses is increased.

11. The method according to claim 1, wherein the shearing of the bosses along each other is carried out at an elevated temperature between about 50° C. and 90° C.

12. The method according to claim 1, wherein the reorientation in the thinner webs interconnecting the bosses, caused by the shearing of the bosses along each other, also extends to the boundaries between the bosses and the thinner webs.

13. The method according to claim 1, wherein the shearing of the bosses along each other with simultaneous reorientation of the thinner webs is carried out by gripping the web in a linear nip between two supporting and conveying surfaces, which feed and convey the web in a direction which forms an angle u to the perpendicular to the linear nip, the size of the angle u being adapted to a desired change in the direction of the angle v, and the web is pulled off from the nip in a direction perpendicular to the extension of the nip by a pulling device which is spaced closely to the nip.

14. The method according to claim 13, wherein the nip is formed between a pair of rotating rollers, each with its surface composed of a number higher than 3 of axially movable segments, which are brought to reciprocate along the axial direction in coordination with the rotation of the rollers such that the web constantly is fed to the nip under the same angle u.

15. The method according to claim 13, wherein the direction of the bosses at the inlet to the nip is parallel to this nip.

16. The method according to claim 1, further comprising:
subsequent to the increase of the angle v, selectively heating the webs to reduce the orientation in the webs.

17. The method according to claim 1, further comprising:
subsequently, cross-laminating the web A with at least one further film B having a main direction of orientation.

18. The method according to claim 17, wherein the film B is oriented mainly in its longitudinal direction.

19. The method according to claim 17, wherein the film B also has been segmentally stretched to form linear bosses distributed over the film B surface with a division between adjacent bosses of no larger than about 3 mm, integrally connected by thinner webs extending in a direction which is generally parallel with the direction of orientation in the film B.

20. The method according to claim 19, wherein in even distribution over the area of the laminate at least 50% of the areas of the thinner linear webs in the web A and in the film B are unbonded or are weakly bonded such that the bond can be eliminated by repeated flexing and rubbing by hand and a majority of each boss to boss bond, is at least as strong as the strongest one of an immediate adjacent thin web to thin web bond as determined by peeling at room temperature.

21. The method according to claim 17, wherein at least one of the films A or B is given a fluted configuration.

22. The method according to claim 1, wherein the material of the film A comprises HDPE, isotactic or syndiotactic PP, or blends between these polymers and/or with LLDPE.

23. The method according to claim 1, wherein the film A is formed as a multilayered, coextruded film comprising a main layer in which the strength mainly resides, and a lower melting surface layer to facilitate lamination.

24. The method according to claim 1, wherein the thinner linear webs are produced by means of intermeshing grooved rollers which perform a generally longitudinal or a generally transverse segmental stretching of the film A, where each crest on the grooved surfaces of the rollers has two edges, each of which is sufficiently sharp for producing the thinner linear web in the film A.

25. The method according to claim 24, wherein the two edges are protruding to limit the contact between the ply and the grooved rollers to the edge portions of the crests.

26. The method according to claim 25, wherein the grooved rollers are heated to a temperature between about 60-80° C., while the web is fed onto the rollers at a lower temperature between about 20-45° C. to selectively heat the ply on the edge portions of the grooved roller crests.

27. The method according to claim 24, wherein a pitch of the grooved rollers is less than 5 mm, and a distance from one to the other of the two edges on the crest is between about 0.3-0.5 mm, and a radius of curvature of the sharp edges is less than 50 µm.

28. The method according to claim 24, wherein the segmental stretching is a transverse stretching between first circular grooved rollers, where prior to this segmental stretching, the ply is subjected to a second segmental stretching between second circular grooved rollers, the second segmental stretching between second circular grooved rollers
  a) producing only one stretching zone on each crest,
  b) having under the operational conditions exactly the same pitch as the first grooved rollers, and c) being in exact registration with the first grooved rollers such that each stretching zone formed by the second grooved rollers falls between or joins with the two stretching zones formed on the edges of one crest of the first grooved rollers.

29. A film comprising a thermoplastic polymer material and having a longitudinal direction, biaxially oriented with one direction dominating, comprising linear bosses distributed over the film surface with a division between adjacent bosses of no larger than 3 mm integrally connected by thinner linear webs which each by volume is no less than 50% of the average of the two adjacent bosses, the delineation between a boss and an adjacent thinner linear webs being understood as the location where the ply thickness is the average between the thickest part of the boss and the thinnest part of the web, and whereby the main cross-sectional portion of each boss is uniaxially oriented sufficiently to achieve the dominating direction of orientation of the film, where the thinner webs exhibit a main direction of orientation forming an angle different from 90° to the direction of the bosses, this angle being such that upon shrinkage at an elevated temperature, the angle v which the bosses form with the longitudinal direction of film will change to deviate more from 90°.

30. The film according to claim 29, wherein an average thickness of each said thinner web is no larger than 80%, and preferably generally between 25-50% of the maximum thickness of the adjacent bosses.

31. The film according to claim 29, wherein a width of the bosses is no more than 1 mm, and in which the division between the bosses is not more than 2 mm.

32. The film according to claim 29, wherein a width of each thinner region is at least about 50% of the maximum thickness of two adjacent bosses and/or it is no less than 25% of the average width of the two adjacent bosses.

33. The film according to claim 29, wherein the film is crosslaminated with at least one film B, which also exhibits a main direction of orientation.

34. A film comprising a thermoplastic polymer material, biaxially oriented with one direction dominating comprising linear bosses distributed over the film surface with a division between adjacent bosses of no larger than 3 mm, integrally connected by thinner linear webs, the delineation between a boss and an adjacent thin region being understood as the location where the ply thickness is the average between the thickest part of said boss and the thinnest part of said web and whereby the main cross-sectional portion of each boss is uniaxially oriented sufficiently to achieve the dominating direction of orientation of the film, while the thinner webs are biaxially oriented, wherein within distinct narrow areas, the film is in a state of being compressed generally along the direction of the bosses in the form of a fine pleating, while between the pleated areas the film is in a contracted state with respect to the direction of the bosses, so as to counteract an elimination of the pleating.

35. The film according to claim 34, wherein the average thickness of each said thinner web is no larger than 80%, and between 25-50% of the maximum thickness of the adjacent bosses.

36. The film according to claim 34, wherein a width of the bosses is generally no more than about 1 mm, and in which the division of the bosses is no more than 2 mm.

37. The film according to claim 34, wherein a width of each thinner region is at least about 50% of the maximum thickness of the two adjacent bosses and/or it is no less than 25% of the average width of the two adjacent bosses.

38. The film according to claim 34, wherein its weight is at the highest about 50 gm$^{-2}$.

39. The film according to claim 34, wherein the bosses are perpendicular to its longitudinal direction.

40. The film according to claim 34, wherein the bosses are parallel with its longitudinal direction.

41. The film according to claim 34, wherein the direction of the bosses deviates essential from its longitudinal direction and from the direction perpendicular thereto or it forms an angle of about 30-60° to the longitudinal direction.

42. The film according to claim 34, further being cross-laminated with a film D which also has a main direction of orientation.

43. The film according to claim 42, wherein the film D also consists of an array of linear bosses distributed over its film surface with a division no larger than 3 mm, integrally connected by thinner webs, and the bonding is loose.

44. The film according to claim 33, wherein the film is for the manufacture of bags.

45. The film according to claim 33, wherein the film is for the manufacture of pipes or hoses.

46. The film according to claim 33, wherein the film is a cover sheet or tarpaulin.

47. An apparatus for manufacturing an oriented film A of thermoplastic polymer material, comprising
an extrusion die for extruding thermoplastic polymer material, in tubular form, means for hauling the tubular film, means for providing a main direction of orientation during the haul-off from the die while in molten or semi-molten state, this main direction being at angle of between 0° and 45° to the axis of the tube, and;
helical cutting device for cutting the tube under an angle to its main direction of orientation to form a film web with a longitudinal direction having a main direction of orientation of no less than 20° to the longitudinal direction,
downstream of the haul-off means and at the latest indirect succession to the cutting device, means for segmentally stretching the film to form linear bosses distributed over the film surface with a division between adjacent bosses of no larger than 3 mm, integrally connected by thinner webs, the bosses and webs extending in a direction which is generally parallel with the direction of orientation and which forms an acute angle v to the longitudinal direction of the web, and
downstream of the segmental stretching means and of said cutting device, shearing means for shearing the bosses along one another under reorientation in the connecting webs to increase the angle v.

48. The apparatus according to claim 47, wherein the shearing means are capable of increasing the angle v to a value higher than 80°.

49. The apparatus according to claim 47, further comprising:
downstream of the shearing means, lateral stretching means for further stretching film (A) in its lateral direction.

50. The apparatus according to claim 49, in which the lateral stretching means comprises intermeshing grooved rollers, the grooves of which are circular or helical.

51. The apparatus according to claim 49, in which the lateral stretching means comprises a tenter frame.

52. The apparatus according to claim 49, in which the lateral stretching means include means to allow the film to contract in a machine direction.

53. The apparatus according to claim 52, in which the contracting means include a pleating device.

54. The apparatus according to claim 47, wherein the shearing means comprises a linear nip between two supporting and conveying surfaces for gripping the film, whereby the film can be fed and conveyed in a direction which forms an angle u to the perpendicular to the linear nip, the size of u being adapted to the desired change in the direction v, further comprising a pulling device for pulling the film off from said nip in a direction perpendicular to the extension of the nip, which is spaced closely to the nip.

55. The apparatus according to claim 54, wherein the nip is formed between a pair of rotating rollers, each with its surface composed of a number higher than 3 of axially movable segments, which are reciprocable along the axial direction in coordination with the rotation of the rollers such that the film constantly can be fed to the nip under the same angle u.

56. The apparatus according to claim 47, further comprising:
   heating means for selectively heating the webs downstream of the shearing means.

57. The apparatus according to claim 47, further comprising:
   downstream of the shearing means, means to cross-laminate the film A with at least one further film (B) having a main direction of orientation.

58. The apparatus according to claim 47, wherein the segmental stretching means are intermeshing grooved rollers which perform a longitudinal or an angular segmental stretching of the ply, where each crest on the grooved surfaces of the rollers has two edges, each of which is sufficiently sharp for producing the said thinner web in the film.

59. The apparatus according to claim 58, wherein the two edges protrude to limit the contact between the film and the grooved rollers to the edge portions of the crests.

60. The apparatus according to claim 58, wherein the pitch of the grooved rollers is less than 5 mm, in that a distance from one to the other of the two edges on the crest is between 0.3 and 0.5 mm, and in that a radius of curvature of the sharp edges is less than 50 µm.

61. The apparatus according to claim 58, further comprising a second circular grooved roller, which produce only one stretching zone on each crest, have under the operational conditions exactly the same pitch as the first grooved rollers, and are in exact registration with the first grooved rollers such that each stretching zone formed by the second grooved rollers falls between or joins with the two stretching zones formed on the edges of one crest of the first grooved rollers.

62. The apparatus according to claim 55, wherein the means for causing each segment to slide comprise a curved track positioned at least one end of the roller of which that segment is part around that end and with which the segment is rotatably engaged, the curvature of the track being such that the segments are reciprocated longitudinally as they rotate relative to the track.

* * * * *